United States Patent [19]
Tsung et al.

[11] Patent Number: 5,592,843
[45] Date of Patent: Jan. 14, 1997

[54] SPLINE RACK

[75] Inventors: Wei-Jiung Tsung, Fort Wayne; James Fisher, Huntertown, both of Ind.

[73] Assignee: Dana Corporation, Toledo, Ohio

[21] Appl. No.: 386,922

[22] Filed: Feb. 10, 1995

[51] Int. Cl.⁶ .................................................. B21H 5/00
[52] U.S. Cl. ...................................... 72/88; 72/469
[58] Field of Search ............................ 72/88, 90, 469, 72/102

[56]         References Cited

U.S. PATENT DOCUMENTS

| | | | |
|---|---|---|---|
| 446,042 | 2/1891 | Warren | 72/88 |
| 4,227,396 | 10/1980 | Crowe | 72/469 |
| 4,646,549 | 3/1987 | Saito | 72/88 |
| 4,712,408 | 12/1987 | Killop . | |
| 4,741,191 | 5/1988 | Anderson et al. . | |
| 4,756,179 | 7/1988 | Anderson et al. . | |
| 4,779,476 | 10/1988 | Anderson et al. . | |
| 4,787,230 | 11/1988 | Hikuma | 72/88 |
| 4,819,468 | 4/1989 | Anderson . | |

FOREIGN PATENT DOCUMENTS

| | | | |
|---|---|---|---|
| 107738 | 6/1984 | Japan | 72/88 |
| 280936 | 11/1990 | Japan | 72/88 |

Primary Examiner—Daniel C. Crane
Attorney, Agent, or Firm—Oldham & Oldham Co., LPA

[57]              ABSTRACT

An improved spline rack for use on a spline rack cutter is disclosed wherein the spline rack includes a plurality of teeth each having a top land surface that curves toward the inner tooth edge region, and the inner tooth edge region of each tooth includes a chamfer connecting the inner tooth edge region with the curved portion of the top land surface. In this manner, the exit radius of curvature of the inner top land surface may be maximized, while the chamfer prevents interference between the inner tooth edge region and the workpiece. A method of forming an improved spline rack is also disclosed.

6 Claims, 3 Drawing Sheets

5,592,843

SPLINE RACK

FIELD OF INVENTION

The present invention relates generally to the field of gear manufacturing using a spline rack cutter, and more particularly to an improved spline rack for use on a spline rack cutter. This invention also relates to a method of utilizing the disclosed spline rack to manufacture an improved gear.

BACKGROUND OF THE INVENTION

In the manufacture of motor vehicle drivetrain subassemblies such as transmissions and four wheel drive transfer cases, it is often necessary to utilize cylindrical members including external teeth or splines to act as pinion gears and other components. One common method of forming external splines on a cylindrical workpiece involves rolling the workpiece under pressure between a pair of elongated spline racks including a plurality of teeth located generally transverse relative to the direction of movement of each spline rack. In particular, the spline racks are connected to a machine known as a spline rack cutter that moves each spline rack along a path in the direction of its longitudinal axis in a direction opposite the other spline rack while the cylindrical workpiece is located between the pair of spline racks. In this manner, the plurality of teeth on each spline rack engage the workpiece and form teeth in the surface thereof.

In manufacturing gears such as pinion gears, it is often necessary to form the splines on a smaller diameter region of a workpiece, immediately adjacent to a larger diameter region of the workpiece. The larger diameter region therefore creates a shoulder that can interfere with the spline rolling operations. In order to form teeth on a workpiece as close to the shoulder as possible, prior spline rack cutters have utilized teeth having a chamfered inner corner such that the planar top land surface of each spline rack tooth was connected to the inner edge region of each tooth by means of a chamfer. While this prior design facilitated forming teeth on a workpiece close to the shoulder of the workpiece, the teeth formed on the workpiece were not as strong as desired. Also, the corner of each spline rack tooth formed by the intersection of the planar top land surface and the chamfered inner edge region was found to be susceptible to chipping.

Another attempted solution has involved utilizing spline rack teeth wherein the inner edge region of each tooth is joined to the top land surface by means of a continuous curve. This curved or rounded inner corner region of each spline rack tooth forms teeth on the workpiece such that the bottom land or valley region between each tooth formed on the workpiece curves upward and into the shoulder. This curved transition surface between the shoulder of the workpiece and the bottom land region found between each tooth formed on the workpiece has been found to increase the strength of the teeth formed on the workpiece. Also, these spline rack teeth having rounded inner corners have been found to be less susceptible to chipping relative to the chamfered teeth discussed above.

The curvature of the inner corners of these prior spline rack teeth has heretofore been required to be a relatively sharp to prevent the inner edge region of each spline rack tooth from contacting and/or otherwise interfering with the shoulder of the workpiece. One prior attempt to provide spline rack teeth with more gradually curved inner corner regions involved changing the diameter of the workpiece to "lower" the shoulder. However, this is often not possible due to design requirements such as the strength of the workpiece, or the relationship of the workpiece to other components in the final product.

SUMMARY OF THE INVENTION

The present invention is therefore directed to a spline rack for use on a spline rack cutter capable of moving the spline rack on a path along its longitudinal axis, the spline rack comprising at least one tooth having a top land surface extending generally transverse relative to the path of movement and between an inner tooth edge region and an outer tooth edge region, wherein the top land surface includes a curved portion extending toward the inner tooth edge region, and wherein the inner tooth edge region includes a chamfer joining the inner tooth edge region with the curved portion of the top land surface.

The present invention provides the advantage of forming teeth on a workpiece having increased strength without requiring modification of the workpiece.

DETAILED DESCRIPTION OF THE INVENTION

Figure 1:
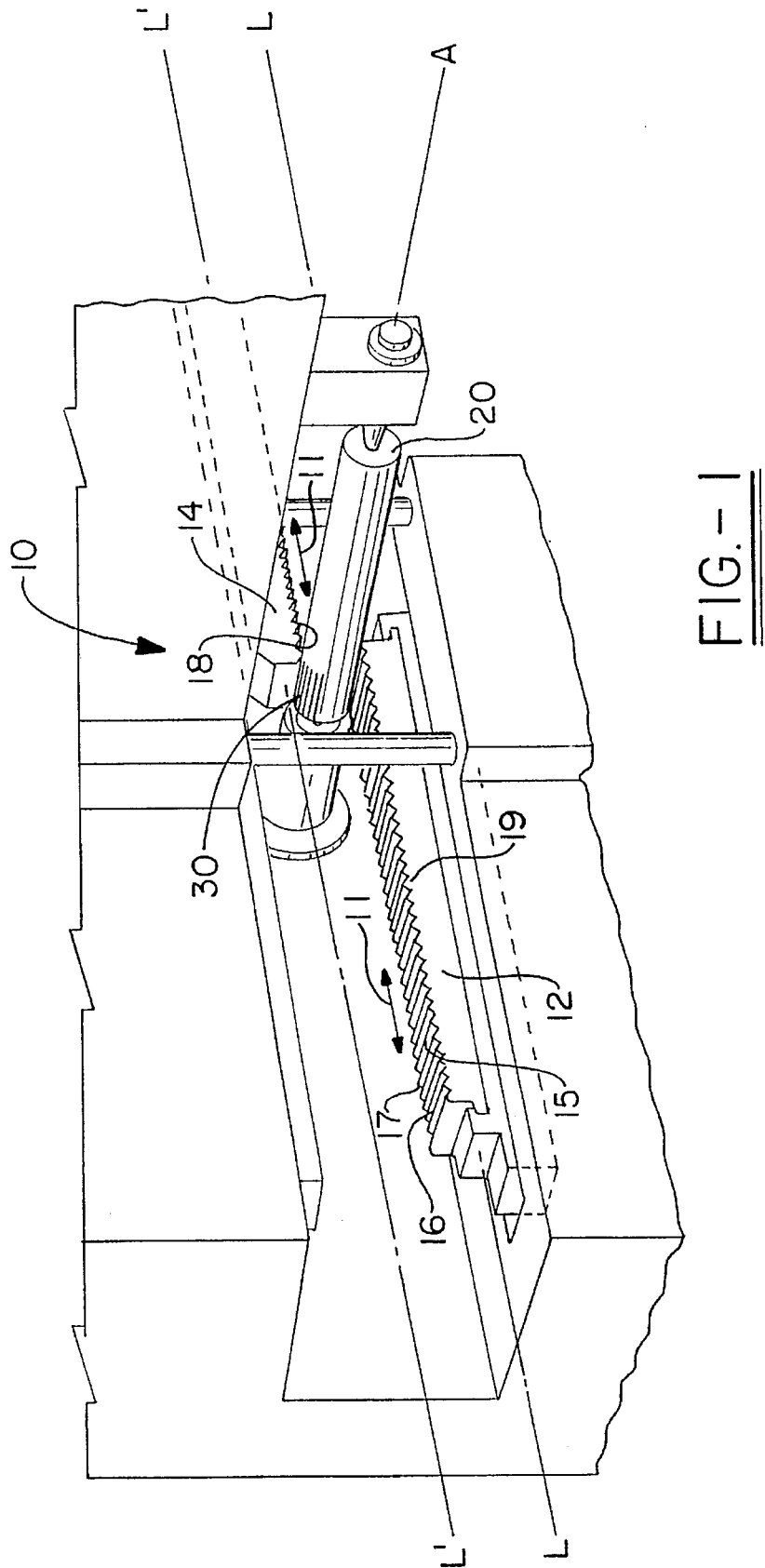
FIG. 1 is a partial perspective view of a spline rack cutter.

Referring to FIG. 1, a spline rack cutter that may be used to form external splines on a cylindrical workpiece 20 is shown generally at 10 and includes a pair of elongated spline racks 12,14 each including a plurality of teeth 16,18, respectively. A workpiece 20 is supported for rotation about its axis A by the spline rack cutter 10 between pair of spline racks 12,14. Spline racks 12,14 are elongated members slidably mounted to spline rack cutter 10 in a parallel spaced relationship with respect to each other such that each spline rack 12,14 is capable of sliding movement on a path in a direction along its respective longitudinal axis L,L'as is indicated by arrows 11.

Teeth 16,18 extend generally transversely with respect to the direction of movement of the spline racks 12,14 such that each tooth 16,18 has a top land surface 15 (FIG. 2) which extends between an inner tooth edge region 17 and an outer tooth edge region 19. Spline rack cutter 10 is capable of moving at least one of spline racks 12,14 along its respective longitudinal axis L,L' as indicated by arrows 11 such that workpiece 20 is rolled between spline racks 12,14 under pressure to thereby form external teeth or splines 30 around the circumference of cylindrical workpiece 20. Workpiece 20 may be a cylindrical shaft upon which teeth or splines 30 are formed such that workpiece 20 can be used as a pinion gear of a drivetrain subassembly such as a transmission or a four wheel drive transfer case. As can also be seen in FIG. 2, workpiece 20 contains a shoulder 22 where its diameter changes along its longitudinal axis A. In particular, it can be seen that the axially outward region 21 of workpiece 20 is of a smaller diameter relative to the axially inward region 22 of workpiece 20. Due to design and engineering considerations, it is usually necessary and desirable to form splines 30 as close to shoulder 22 as possible, without causing top land surface 15 or inner tooth edge region 17 of spline racks 12,14 to contact or interfere with shoulder 22. The invention is not meant to be limited for use in forming splines on the particular workpiece shown, and those skilled in the art will recognize that the invention is suitable for use in forming external splines upon any generally cylindrical workpiece.

Figure 2:
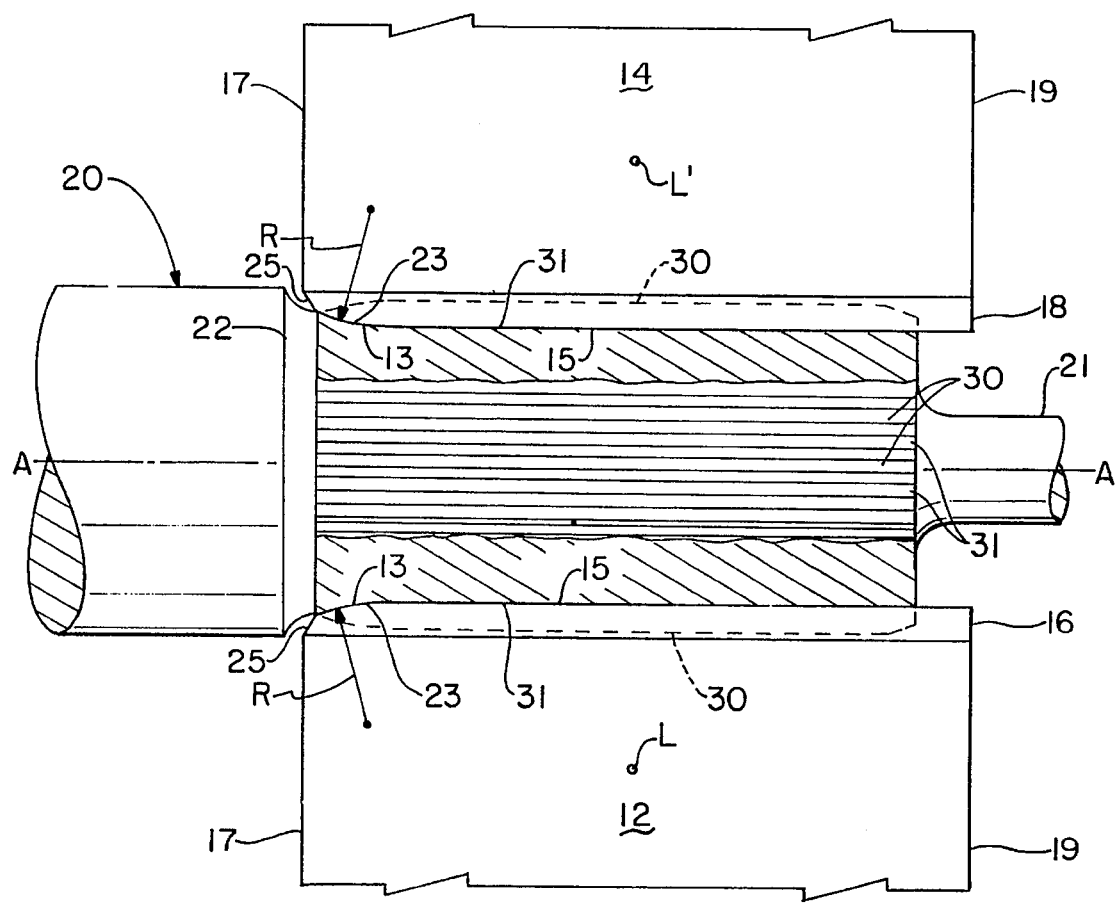
FIG. 2 is an enlarged side elevational view of a pair of spline racks having teeth shaped in accordance with the present invention as they may be used to form splines on a workpiece.
Figure 4:
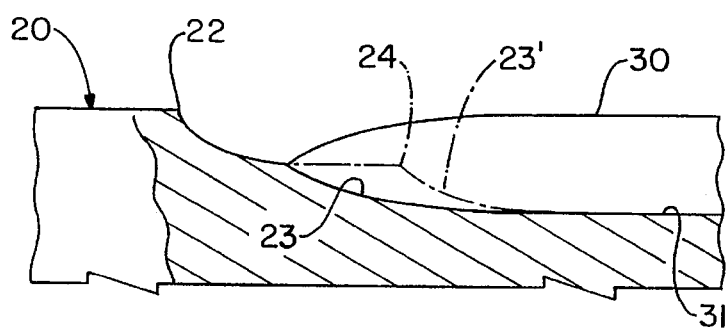
FIG. 4 is a greatly enlarged partial view in cross section of a tooth formed on a workpiece using the apparatus or method as disclosed herein.
Figure 3:
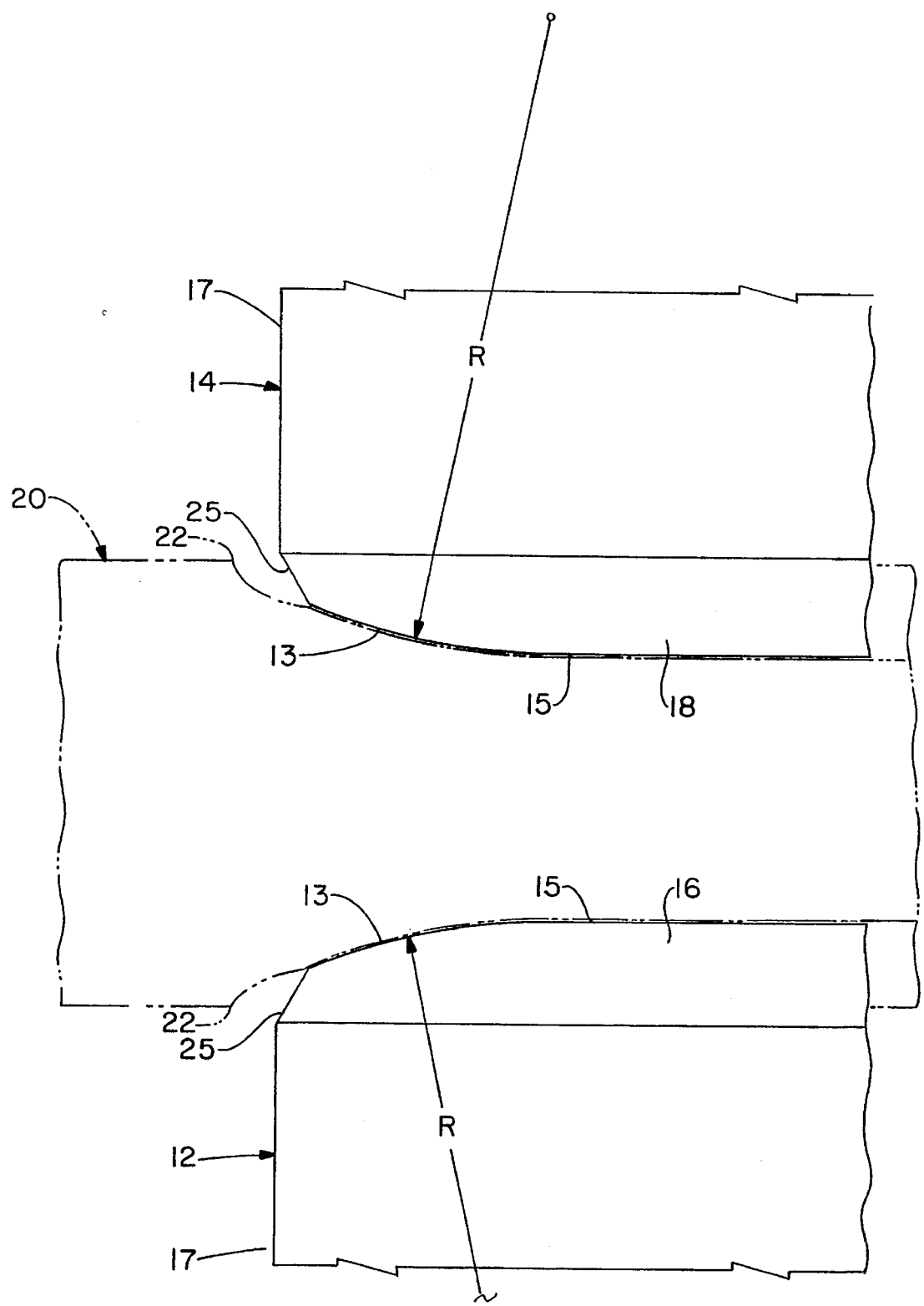
FIG. 3 is a greatly enlarged side elevational view of a pair of spline racks having teeth shaped in accordance with the present invention.

As can be seen most clearly in FIGS. 2 and 3, the top land surface 15 of each tooth 16,18 of the present invention includes a curved portion 13 that extends toward the inner edge region 17 of each tooth 16,18. Curved portion 13 of top land surface 15 typically includes a circular arc, when viewed in cross section, and may therefore be measured in terms of its radius of curvature R as is shown in FIG. 3. This radius measurement R is typically referred to as the exit radius of the spline rack tooth 16,18. A larger exit radius R is associated with a more gradually curved portion 13 on top land surface 15 which consequently forms a more gradually curved surface 23 (as seen in FIG. 4) between shoulder 22 of workpiece 20 and the bottom land region 31 of each tooth 30 formed on a workpiece 20. A spline rack tooth having a smaller exit radius, as may be found on prior spline rack cutters, has a less gradually curved portion on the inner top land surface. As is shown in phantom in FIG. 4, use of these prior spline rack teeth, each having a curved region on the top land surface with a smaller exit radius, forms a relatively steep transitional surface 23'between the shoulder of the workpiece and the bottom land region found between each tooth formed on the workpiece. Also as is shown in phantom, use of prior spline rack cutters having teeth with smaller exit radius curved portions may result in the formation of a cusp 24 at the point where the shoulder of the workpiece meets the bottom land region. Cusp 24 may cause undesirable stress concentrations during use of the finished workpiece resulting in damage to teeth formed on the workpiece. Spline rack teeth 16,18 having top land surfaces 15 with large exit radius R curved portions 13 therefore provide numerous advantages relative to teeth 16,18 having smaller exit radius curved portions 13. Most notably, providing top land surface 15 with a curved portion 13 having a large exit radius R forms a stronger tooth 30 on workpiece 20. Also, spline rack teeth 16,18 formed to have a top land surface 15 with a large radius curved portion 13 are less susceptible to chipping at the point where top land surface 15 joins inner edge region 17.

It can be seen however that as the exit radius R of the curved portion 13 is made larger, it becomes more difficult to roll splines 30 onto the workpiece 20 as close to shoulder 22 as required without causing inner tooth edge region 17 to contact and interfere with shoulder 22. The present invention solves this problem by forming spline rack teeth 16,18 to have a top land surface 15 including a curved portion 13 extending toward the inner tooth edge region 17 and by providing inner tooth edge region 17 with a chamfer 25 to connect or join curved portion 13 of top land surface 15 to inner tooth edge region 17. Those skilled in the art will recognize from the foregoing that providing inner tooth edge region 17 with chamfer 25 allows exit radius R of curved portion 13 of top land surface 15 to be increased without causing contact between shoulder 22 of workpiece 20 and inner tooth edge region 17 of teeth 16,18. In one particular application, the exit radius of each spline rack tooth was increased from approximately 0.157" to an exit radius R of at least 0.250" utilizing a spline rack tooth formed as described herein, with the most preferable exit radius R for the particular application being 0.400". It is thought preferable to form teeth 16,18 such that only the top land surface 15, including curved region 13, performs work on the surface of the workpiece 20. Chamfer 12 preferably does not contact workpiece 20. In this manner, the bottom land regions 31 between each tooth 30 formed on workpiece 20 will gradually blend into shoulder 22 of workpiece 20 to provide a superior finished part.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A spline rack for use on a spline rack cutter capable of moving said spline rack on a path in the direction of its longitudinal axis, said spline rack comprising:

at least one tooth having a top land surface extending generally transverse relative to said path of movement and between an inner tooth edge region and an outer tooth edge region, and wherein said inner tooth edge region includes a chamfer joining said inner tooth edge region with said curved portion of said top land surface, said curved portion providing an upwardly curved bottom land portion toward a workpiece inner tooth edge in a workpiece having a shoulder adjacent said workpiece inner tooth edge.

2. A spline rack as recited in claim 1, wherein said curved portion of said top land surface comprises a circular arc when viewed in cross section.

3. A spline rack as recited in claim 2, wherein said circular arc has a radius of curvature equal to at least 0.250".

4. A method of forming an improved spline rack tooth having an inner tooth edge region and a top land surface, said method comprising the steps of:

forming a curved region on said top land surface such that said curved region extends toward said inner tooth edge;

forming a chamfer on said inner tooth edge to connect said inner tooth edge with said curved region of said top land surface, said curved region providing an upwardly curved bottom land portion toward a workpiece inner tooth edge in a workpiece having a shoulder adjacent said workpiece inner tooth edge.

5. A method as recited in claim 4, wherein said step of forming a curved region on said top land surface comprises the step of shaping said top land surface to have a circular arc when said spline rack tooth is viewed in cross section.

6. A method of forming a gear from a cylindrical workpiece including a shoulder adjacent to a workpiece inner tooth edge, said method comprising the steps of:

providing a pair of spline racks, wherein each of said pair has at least one tooth including an inner tooth edge region and a top land surface;

forming a curved region on said top land surface of said at least one tooth of each of said pair of spline racks such that said curved region extends toward said inner tooth edge region of said at least one tooth;

forming a chamfer on said inner tooth edge region of said at least one tooth of each of said pair of spline racks to connect said inner tooth edge region with said curved region of said top land surface;

rotatably supporting said cylindrical workpiece between said pair of spline racks;

rolling said cylindrical workpiece between said pair of spline racks under pressure such that said at least one tooth of each of said pair of spline racks forms teeth on said workpiece, and such that said curved region of said top land surface of said at least one tooth of each of said pair of spline racks forms an upwardly curved surface in the bottom land region of the workpiece inner tooth edge adjacent said shoulder of said workpiece.

* * * * *